(12) United States Patent
Mimeault et al.

(10) Patent No.: US 11,193,809 B2
(45) Date of Patent: Dec. 7, 2021

(54) EXPERT CONTROL SYSTEMS AND METHODS FOR LEVEL MEASUREMENT

(71) Applicant: ABB Schweiz AG, Baden (CH)

(72) Inventors: Yvan Mimeault, Quebec (CA); Vincent Marceau, Quebec (CA); Paul Bareil, Quebec (CA)

(73) Assignee: ABB SCHWEIZ AG, Baden (CH)

( * ) Notice: Subject to any disclaimer, the term of this patent is extended or adjusted under 35 U.S.C. 154(b) by 449 days.

(21) Appl. No.: 16/371,129

(22) Filed: Apr. 1, 2019

(65) Prior Publication Data

US 2020/0309587 A1    Oct. 1, 2020

(51) Int. Cl.
*G01F 23/284* (2006.01)
*G06N 5/02* (2006.01)

(52) U.S. Cl.
CPC ........... *G01F 23/284* (2013.01); *G06N 5/022* (2013.01)

(58) Field of Classification Search
CPC .............................. G01F 23/284; G06N 5/022
See application file for complete search history.

(56) References Cited

U.S. PATENT DOCUMENTS

| | | | |
|---|---|---|---|
| 5,723,979 A | 3/1998 | Mohr | |
| 5,884,231 A | 3/1999 | Perdue et al. | |
| 5,969,666 A | 10/1999 | Burger et al. | |
| 5,973,637 A | 10/1999 | Perdue et al. | |
| 6,078,280 A | 6/2000 | Perdue et al. | |
| 6,087,978 A | 7/2000 | Lalla et al. | |
| 6,178,817 B1 | 1/2001 | Hewelt et al. | |

(Continued)

FOREIGN PATENT DOCUMENTS

| | | |
|---|---|---|
| EP | 2071302 A2 | 6/2009 |
| EP | 2327966 A1 | 11/2009 |

OTHER PUBLICATIONS

D.A. Linkens et al., "Expert Control Systems—I. Concepts, Characteristics and Issues," Engineering Applications of Artificial Intelligence, vol. 8, No. 4, Aug. 1, 1995, pp. 413-421.

(Continued)

*Primary Examiner* — Regis J Betsch
(74) *Attorney, Agent, or Firm* — Armstrong Teasdale LLP

(57) ABSTRACT

In at least one illustrative embodiment, a guided wave radar (GWR) level transmitter may comprise a waveguide probe to be positioned in a tank containing media, a measurement circuit, and a compute device. The measurement circuit may transmit a series of pulses along the waveguide probe and measure a series of reflected waveforms, where each of the series of reflected waveforms resulting from transmission of one of the series of pulses along the waveguide probe. The compute device may implement an expert control system to determine a level of the media in the tank, where the expert control system comprises (i) a knowledge base incorporating prior knowledge and (ii) an inference engine to apply logical rules from the knowledge base to evaluate information contained in the series of reflected waveforms to determine the level of media in the tank. The prior knowledge may comprise a system model of the GWR level transmitter, behaviors associated with typical level measurement applications, and/or system parameters supplied by a user of the GWR level transmitter.

20 Claims, 7 Drawing Sheets

(56) References Cited

U.S. PATENT DOCUMENTS

| | | |
|---|---|---|
| 6,247,362 B1 | 6/2001 | Soroka |
| 6,295,018 B1 | 9/2001 | Diede et al. |
| 6,373,428 B1 | 4/2002 | McEwan |
| 6,559,657 B1 | 5/2003 | McCarthy et al. |
| 6,679,115 B2 | 1/2004 | Heidecke |
| 7,255,002 B2 | 8/2007 | Gravel et al. |
| 7,283,096 B2 | 10/2007 | Geisheimer et al. |
| 7,284,425 B2 | 10/2007 | Wennerberg et al. |
| 7,334,451 B1 | 2/2008 | Fauveau |
| 7,412,337 B2 | 8/2008 | Michalski et al. |
| 7,420,877 B2 | 9/2008 | Hosseini et al. |
| 7,710,125 B2 | 5/2010 | Schultheiss et al. |
| 8,022,862 B2 | 9/2011 | Larocque et al. |
| 8,044,844 B2 | 10/2011 | Nyberg |
| 8,639,457 B2 | 1/2014 | Hammer et al. |
| 8,844,352 B2 | 9/2014 | Nilsson et al. |
| 8,963,768 B2 | 2/2015 | Kienzle et al. |
| 8,963,769 B2 | 2/2015 | Linden et al. |
| 9,593,976 B2 | 3/2017 | Nilsson et al. |
| 9,810,568 B2 | 11/2017 | Heath |
| 2002/0053238 A1 | 5/2002 | Fahrenbach et al. |
| 2002/0109626 A1 | 8/2002 | Spanke |
| 2002/0177961 A1* | 11/2002 | Lovegren ............... G01N 22/00 702/50 |
| 2005/0168379 A1 | 8/2005 | Griessbaum et al. |
| 2006/0225499 A1 | 10/2006 | Gravel et al. |
| 2006/0274871 A1 | 12/2006 | Griessbaum |
| 2007/0084281 A1 | 4/2007 | Fredriksson |
| 2008/0134778 A1 | 6/2008 | Osswald et al. |
| 2009/0146867 A1* | 6/2009 | Delin .................... G01F 23/284 342/124 |
| 2012/0265486 A1* | 10/2012 | Klofer ................ G01F 23/2962 702/166 |
| 2016/0097669 A1* | 4/2016 | Backstrom ............ G01F 23/296 342/124 |
| 2016/0266240 A1* | 9/2016 | Hughes .................... G01S 13/88 |
| 2018/0238997 A1* | 8/2018 | Turcotte ................ G01S 13/522 |

OTHER PUBLICATIONS

European Patent Office, International Search Report and Written Opinion for related PCT/EP2020/059270, dated Jul. 2, 2020, 13 pages.

European Patent Office, International Search Report and Written Opinion for related PCT/EP2020/059263, dated Jul. 8, 2020, 15 pages.

European Patent Office, International Search Report and Written Opinion for related PCT/EP2020/059257, dated Jun. 29, 2020, 15 pages.

* cited by examiner

EXPERT CONTROL SYSTEMS AND METHODS FOR LEVEL MEASUREMENT

TECHNICAL FIELD

The present disclosure relates to the technical field of level measurement. More particularly, the present disclosure relates to the technical field of level measurement using expert control systems and methods.

BACKGROUND

Guided wave radar (GWR) techniques are used for level measurements in industrial applications. The guided wave radar transmits a pulse along a waveguide and receives a reflected waveform in response to the transmitted pulse. The level of media in a tank is calculated based on the echoes in the reflected waveform. The reflected waveform is affected by multiple variables including the dielectric constant of the media, agitation, emulsion, and the dynamic level rate. The sheer number of variables affecting the reflected waveform vastly increases the complexity of analyzing the reflected waveform. The reliability of level measurements can be critical to avoiding serious incidents in industrial applications, especially in hazardous and explosive environments.

SUMMARY

According to an aspect of the present disclosure, a guided wave radar (GWR) level transmitter may comprise a waveguide probe to be positioned in a tank containing media, a measurement circuit to transmit series of pulses along the waveguide probe and to measure a series of reflected waveforms, each of the series of reflected waveforms resulting from transmission of one of the series of pulses along the waveguide probe, and a compute device to implement an expert control system to determine a level of the media in the tank. The expert control system may comprise (i) a knowledge base incorporating prior knowledge and (ii) an inference engine to apply logical rules from the knowledge base to evaluate information contained in the series of reflected waveforms to determine the level of media in the tank. The prior knowledge may comprise (i) a system model of the GWR level transmitter and (ii) behaviors associated with typical level measurement applications.

In some embodiments, the prior knowledge of the system model of the GWR level transmitter may comprise one or more of characteristics of the series of pulses transmitted by the measurement circuit, characteristics of a signal transfer function of the GWR level transmitter, and compensations and corrections associated with the GWR level transmitter.

In some embodiments, the prior knowledge of the behaviors associated with typical level measurement applications may comprise one or more of transmission line theory information, time-domain reflectometry information, characteristics associated with typical level measurement environments, possible sources of echoes in the series of reflected waveforms, and typical characteristics of echoes generated by each of the possible sources.

In some embodiments, the prior knowledge may further comprise system parameters supplied by a user of the GWR level transmitter. The system parameters supplied by the user of the GWR level transmitter may comprise one or more of a type of the waveguide probe, a length of the waveguide probe, an end type of the waveguide probe, a position of a gas phase compensation marker disposed on the waveguide probe, a nozzle length, a dielectric constant of the media, a category of dielectric constants associated with a type of the media, an interface characteristic of the media, a filling rate of the media, a draining rate of the media, a blocking distance, a type of the tank, a presence of remote electronics, and process conditions for the media.

In some embodiments, the expert control system may comprise echo detection circuitry to detect a plurality of echoes present in each of the series of reflected waveforms and to generate an echo list for each reflected waveform, each echo list identifying the plurality of echoes present in the corresponding reflected waveform and one or more characteristics of each of the plurality of echoes. The one or more characteristics of each of the plurality of echoes included in the echo list comprises an amplitude of the echo and a position of the echo within the corresponding reflected waveform.

In some embodiments, the expert control system may comprise echo tracking circuitry to implement a state estimator filter to track a plurality of recurrent echoes present in successive echo lists generated by the echo detection circuitry and to generate a track list that identifies the plurality of recurrent echoes and one or more characteristics of each of the plurality of recurrent echoes.

In some embodiments, the expert control system may comprise echo classification circuitry to evaluate a probability of each of the plurality of recurrent echoes in the track list belonging to each of a plurality of echo categories and to generate a labelled track list that associates each of the plurality of recurrent echoes with one of the plurality of echo categories based upon the evaluated probabilities. The plurality of echo categories may comprise two or more of an echo representing a surface of the media in the tank, an echo representing an end of the waveguide probe, an echo representing a physical interface between the waveguide probe and the measurement circuit, an echo representing a nozzle, an echo representing a gas phase compensation marker positioned at a known distance along the waveguide probe, an echo representing noise, an echo representing hardware of the GWR level transmitter, and a bounce-back echo of any of the foregoing echo categories.

In some embodiments, the expert control system may comprise decision circuitry to select one of the plurality of recurrent echoes from the labelled track list and to calculate the level of media in the tank based upon the selected echo, wherein the selected echo represents one of a surface of the media in the tank and an end of the waveguide probe.

In some embodiments, the measurement circuit and the compute device of the GWR level transmitter can operate using less than 20 mW of power.

According to an aspect of the present disclosure, a method may comprise transmitting series of pulses along a waveguide probe positioned in a tank containing media, measuring a series of reflected waveforms, each of the series of reflected waveforms resulting from transmission of one of the series of pulses along the waveguide probe, and evaluating information contained in the series of reflected waveforms using an expert control system to determine the level of media in the tank. The expert control system may comprise (i) a knowledge base incorporating prior knowledge and (ii) an inference engine to apply logical rules from the knowledge base to evaluate information contained in the series of reflected waveforms to determine the level of media in the tank. The prior knowledge may comprise (i) a system model of the GWR level transmitter and (ii) behaviors associated with typical level measurement applications.

In some embodiments, the prior knowledge may further comprise system parameters supplied by a user.

In some embodiments, evaluating the information using the expert control system may comprise detecting a plurality of echoes present in each of the series of reflected waveforms, and generating an echo list for each reflected waveform, each echo list identifying the plurality of echoes present in the corresponding reflected waveform and one or more characteristics of each of the plurality of echoes. The one or more characteristics of each of the plurality of echoes included in the echo list comprises an amplitude of the echo and a position of the echo within the corresponding reflected waveform.

In some embodiments, evaluating the information using the expert control system may further comprise implementing a state estimator filter to track a plurality of recurrent echoes present in successive echo lists generated by the echo detection circuitry, and generating a track list that identifies the plurality of recurrent echoes and one or more characteristics of each of the plurality of recurrent echoes.

In some embodiments, evaluating the information using the expert control system may comprise evaluating a probability of each of the plurality of recurrent echoes in the track list belonging to each of a plurality of echo categories, and generating a labelled track list that associates each of the plurality of recurrent echoes with one of the plurality of echo categories based upon the evaluated probabilities. The plurality of echo categories comprise two or more of an echo representing a surface of the media in the tank, an echo representing an end of the waveguide probe, an echo representing a physical interface between the waveguide probe and the measurement circuit, an echo representing a nozzle, an echo representing a gas phase compensation marker positioned at a known distance along the waveguide probe, an echo representing noise, an echo representing hardware of the GWR level transmitter, and a bounce-back echo of any of the foregoing echo categories.

In some embodiments, evaluating the information using the expert control system may comprise selecting one of the plurality of recurrent echoes from the labelled track list, and calculating the level of media in the tank based upon the selected echo, wherein the selected echo represents one of a surface of the media in the tank and an end of the waveguide probe.

These and other features of the present disclosure will become more apparent from the following description of the illustrative embodiments.

BRIEF DESCRIPTION OF THE DRAWINGS

The concepts described in the present disclosure are illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference labels have been repeated among the figures to indicate corresponding or analogous elements. The detailed description particularly refers to the accompanying figures in which.

DETAILED DESCRIPTION OF THE DRAWINGS

Figure 1A:
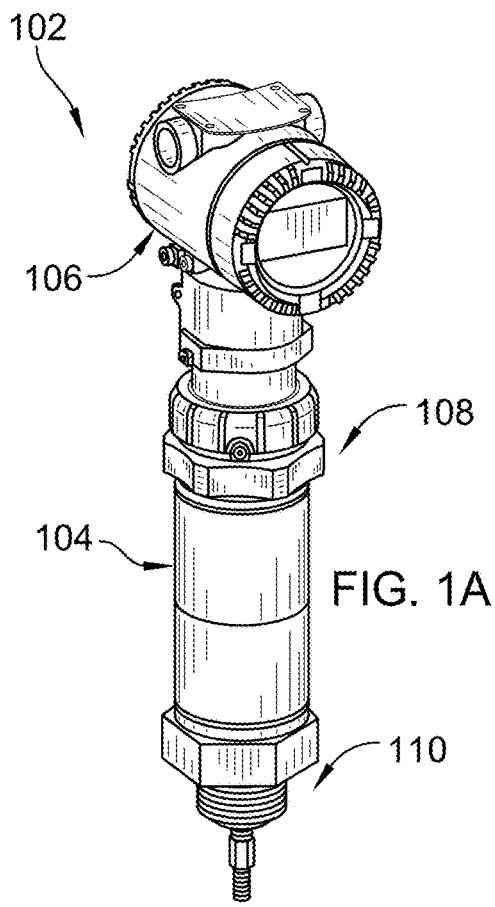
FIG. 1A is a perspective view of an illustrative guided wave radar (GWR) level transmitter that may use the presently disclosed expert control systems and methods.

While the concepts of the present disclosure are susceptible to various modifications and alternative forms, specific embodiments thereof have been shown by way of example in the figures and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

The disclosed embodiments may be implemented, in some cases, in hardware, firmware, software, or any combination thereof. The disclosed embodiments may also be implemented as instructions carried by or stored on a transitory or non-transitory computer-readable storage medium, which may be read and executed by one or more processors. A computer-readable storage medium may be embodied as any storage device, mechanism, or other physical structure for storing or transmitting information in a form readable by a computing device (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

A guided wave radar (GWR) level transmitter transmits a series of pulses along an attached waveguide probe which is positioned in a tank containing a variable level of media. The GWR level transmitter acquires a reflected waveform corresponding to the transmitted pulses, evaluates the echoes within each reflected waveform, and determines a distance to the surface of the media (or, in some embodiments, distances to the surfaces of various media). The GWR level transmitter increases the reliability of its measurements though the use of prior knowledge. In some embodiments, the prior knowledge includes knowledge on the properties of the sensor system, level measurement knowledge, user provided information, and a history of waveforms previously recorded by the sensor. The GWR level transmitter uses the prior knowledge to identify all the echoes in the current received waveform or frame. One of the echoes is identified as the surface of the media, and the distance of that echo is calculated to determine the surface level of the media. Alternatively, in other embodiments, multiple echoes are identified as corresponding to the surfaces of various media, and distances associated with each of those echoes are calculated to determine the levels of the various media.

Figure 1B:
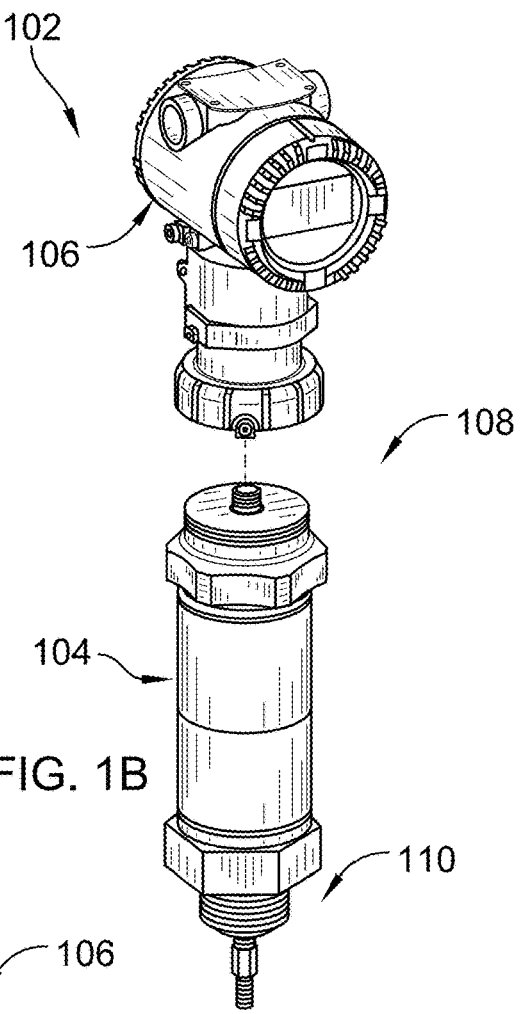
FIG. 1B is a partially-exploded perspective view of the illustrative GWR level transmitter of FIG. 1A.

In the illustrative embodiment as shown in FIGS. 1A and 1B, a GWR level transmitter 102 illustratively includes a coupler 104 receiving connection with an instrumentation head 106. The instrumentation head 106 is selectively connected with the coupler 104 by mounting to a receiving end 108 of the coupler 104 to transmit radio frequency (RF) pulses. The RF signal connection between instrumentation head 106 and coupler 104 can also be made by a coaxial cable (not shown). Opposite the receiving end 108, the coupler 104 includes a mounting end 110 for connection to a tank containing a variable level of media. The coupler 104 is adapted for mounting to the tank to transmit and receive RF pulses with the instrumentation head 106 for monitoring. Additional details concerning illustrative embodiments of couplers that may be used with the GWR level transmitters of the present disclosure may be found in U.S. patent application Ser. No. 16/371,119, filed Apr. 1, 2019, the entirety of which is incorporated by reference herein. It be appreciated that any appropriate coupler 104 may be used with the GWR level transmitter 102 according to the present disclosure.

Figure 2:
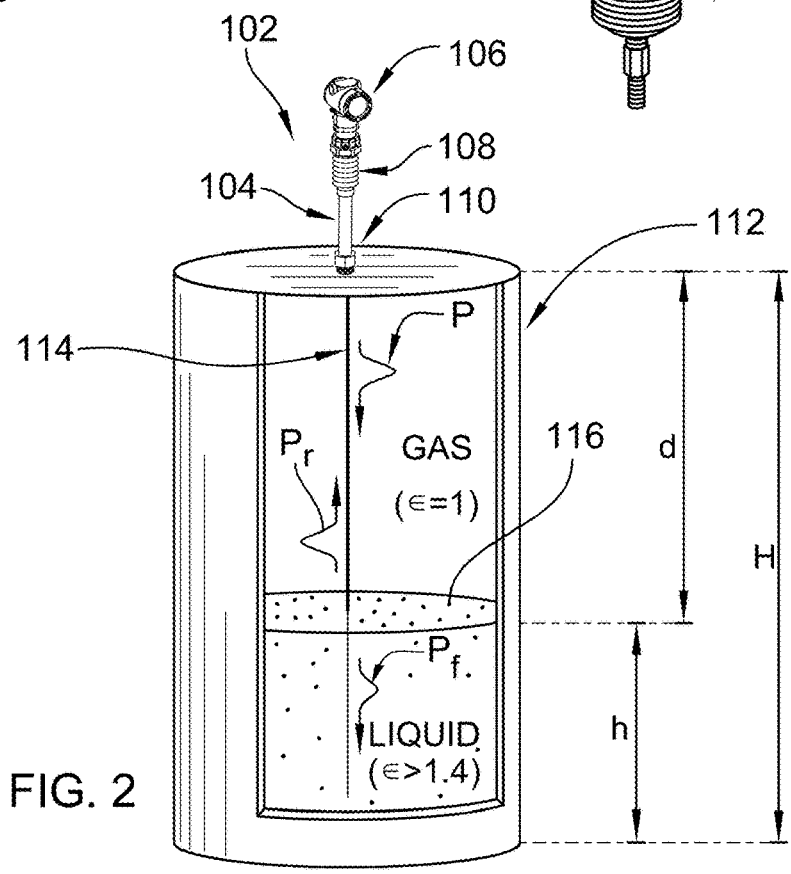
FIG. 2 is a perspective view of the illustrative GWR level transmitter of FIGS. 1A & 1B mounted to a tank, showing that the GWR level transmitter is in communication with a waveguide probe extending through the tank to allow the GWR level transmitter to detect a level of media within the tank by short pulses communicated along the waveguide probe causing a reflection of energy back to the GWR level transmitter from the surface of the media.

Referring to FIG. 2, the GWR level transmitter 102 is shown connected to a tank 112. The GWR level transmitter 102 is illustratively adapted to determine a level of process media inside the tank 112, indicated as height h. GWR level transmitters can operate by applying the time-of-flight measurement principle using, for example, time domain reflectivity (TDR). For example, the GWR level transmitter 102 can transmit RF pulses (p) through a probe 114 which extends inside the tank 112 into the media. The surface 116 of the media reflects a portion of the pulse energy ($p_r$) back through the probe 114 returning to the GWR level transmitter 102 while a fraction of the pulse energy ($p_f$) can pass through into the liquid, depending on its dielectric constant. (It will be appreciated that the dielectric constants ($\epsilon$) shown in FIG. 2 are illustrative and not limiting.) In some applications, more than one layer may be present and may reflect more than one echo back signal. In some embodiments, the RF signals may be modulated, such as, for example, in Frequency-Modulated Continuous Wave (FMCW) arrangements.

The height h of the media can be determined according to the time elapsed ($\Delta t$) between the transmission of the pulse (p) and the receipt of the portion of the pulse energy ($p_r$), based on the speed of light c, where $$d = \frac{c \cdot \Delta t}{2}$$

and the media height h is typically equal to the tank height H less the gas height d, (h=H−d). The pulses (p) are illustratively embodied as short, sub-nanosecond (sub-ns) electromagnetic signal pulses. The equivalent time sampling (ETS) principle allows capture and reconstruction of sub-ns signals into lower frequencies to permit easier digitization with low cost analog-to-digital converters. Although described as a liquid for descriptive purposes, in some embodiments, the media being sensed may take any state and/or form of matter (e.g., a solid) capable of reflecting a portion of pulse energy to the GWR level transmitter 102 for determining the height h of the surface 116. In some embodiments, the GWR level transmitter 102 may be configured to determine the height h as an interface between two different types and/or states of media, for example, where the height h is at the interface height between a layer of oil on the top of a layer of water, known as interface measurement.

In any event, an accurate determination of the media height h requires a proper identification of the portion of the pulse energy ($p_r$) that is returning from the media surface from amongst the many other echoes present in the reflected waveforms. The present disclosure is directed to expert control systems that can reliably identify the sources of each echo present in the reflected waveforms to allow for more accurate determinations of the media level.

Figure 3:
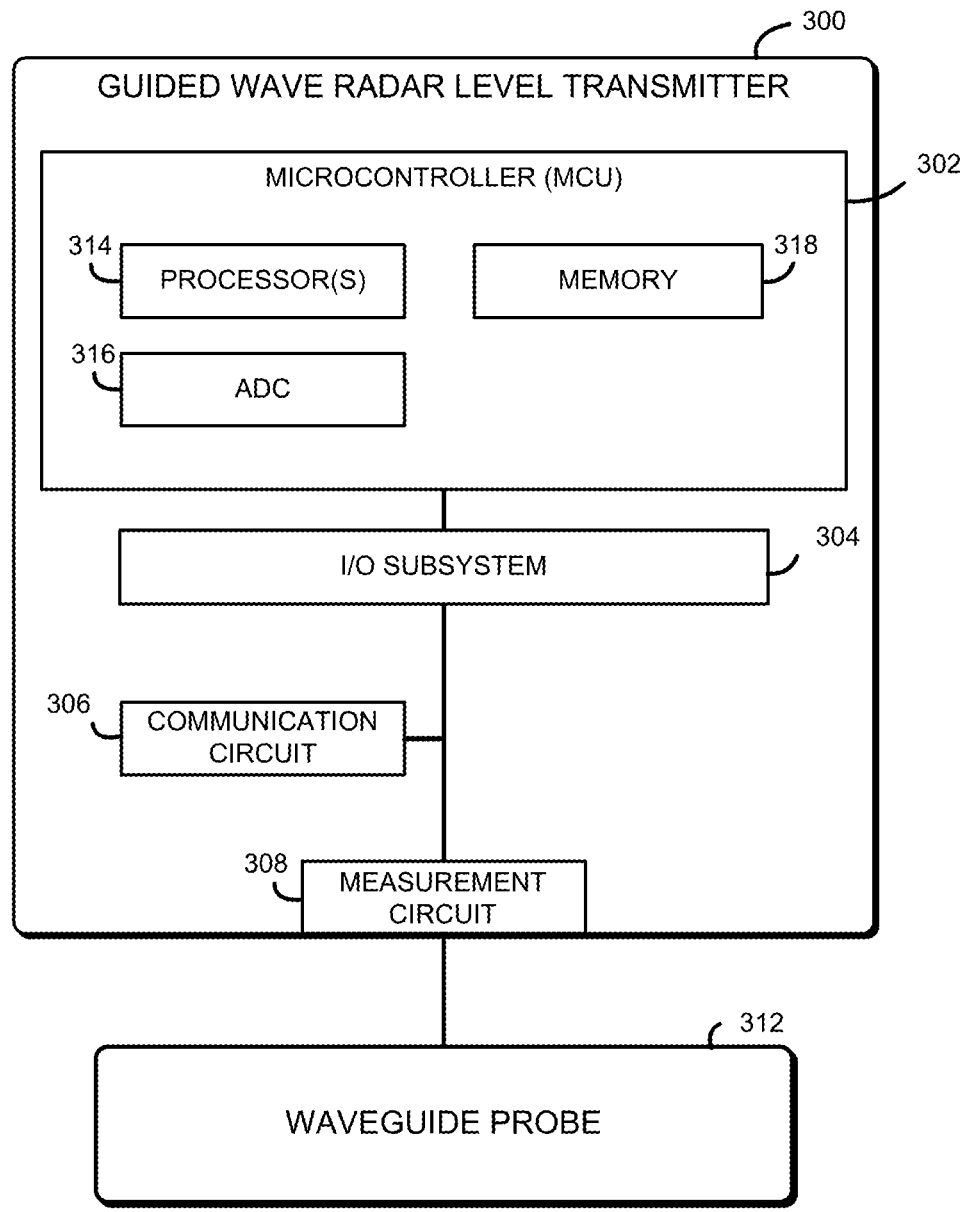
FIG. 3 is a simplified block diagram of selected components of the illustrative GWR level transmitter and waveguide probe of FIGS. 1-2.

Referring now to FIG. 3, a GWR level transmitter 300 for identifying echoes in a waveform and determining the distance to the surface of a media includes a microcontroller unit (MCU) 302, a communication circuit 306, and a measurement circuit 308. It will be appreciated that the GWR level transmitter 300 may include additional components and/or circuitry, which are omitted from FIG. 3 for the sake of clarity. Additional details concerning illustrative embodiments of circuitry that may be used with the GWR level transmitters of the present disclosure may be found in U.S. patent application Ser. No. 16/371,126, filed Apr. 1, 2019, the entirety of which is incorporated by reference herein. It is contemplated that any appropriate circuitry for performing the measurements described herein may be used with the GWR level transmitter 102 according to the present disclosure.

Figure 8:
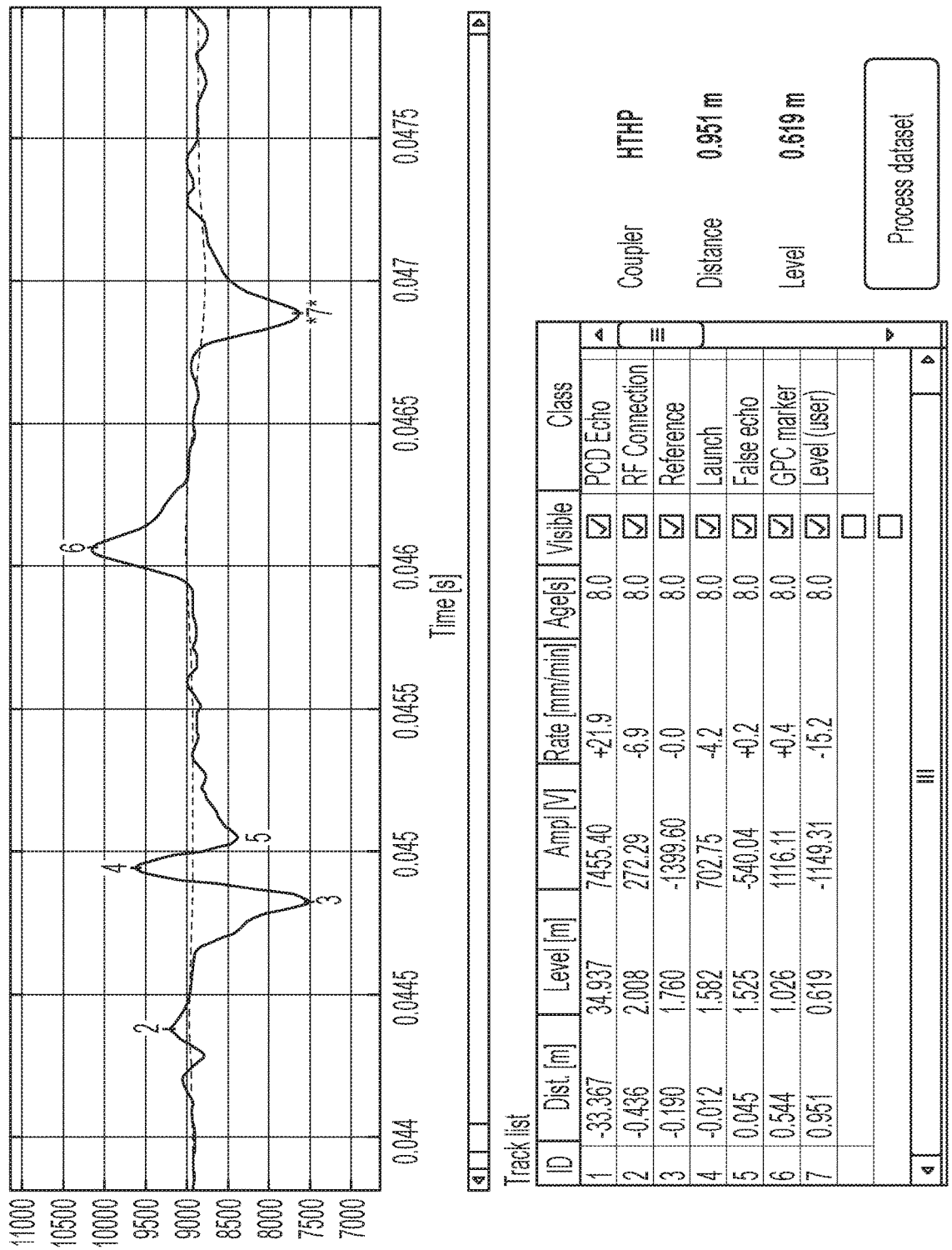
FIG. 8 is an illustrative display of information associated with the GWR level transmitter of FIGS. 1-4 and 7.

In use, the GWR level transmitter 300 may generate pulses using the measurement circuit 308. The pulses from the measurement circuit 308 may be emitted at a predetermined pulse repetition frequency along a waveguide probe 312 and reflected when pulses reach a dielectric discontinuity (e.g., a surface of media in a tank). The reflected waveform is processed by the measurement circuit 308. The processed analog signal is acquired by an analog-to-digital converter (ADC) 316 of the MCU 302 to produce a digital signal to be used to determine a distance of the dielectric discontinuity along the waveguide probe 312. One illustrative example of such a reflected waveform is shown in FIG. 8.

In the illustrative embodiment, the MCU 302 is communicatively coupled to other components of the GWR level transmitter 300 via the I/O subsystem 304, which may be embodied as circuitry and/or components to facilitate input/output operations with the MCU 302, the measurement circuit 308, and other components of the GWR level transmitter 300. For example, the I/O subsystem 304 may be embodied as, or otherwise include, memory controller hubs, input/output control hubs, integrated sensor hubs, firmware devices, communication links (e.g., point-to-point links, bus links, wires, cables, light guides, printed circuit board traces, etc.), and/or other components and subsystems to facilitate the input/output operations. In some embodiments, the I/O subsystem 304 may form a portion of a system-on-a-chip (SoC) and be incorporated, along with one or more of the processor 314, the memory 318, and other components of the MCU 302, into the MCU 302. In some embodiments, the components of MCU 302 may advantageously be included in a single integrated circuit. In some embodiments, the power required to acquire and process data may be lower than 20 mW, lower than 10 mW, or even lower than 5 mW.

As shown in FIG. 3, the MCU 302 may be embodied as any type of compute device for performing the functions described herein. As shown in FIG. 3, the illustrative MCU 302 includes at least one or more processors 314, the analog-to-digital converter (ADC) 316, and a memory 318. The MCU 302 may include other or additional components, such as those commonly found in mobile and/or stationary computers (e.g., various sensors and input/output devices), in other embodiments. The processor 314 may be embodied as any type of processor capable of performing the functions described herein. In some embodiments, the processor 314 may be embodied as, include, or be coupled to a field-programmable gate array (FPGA), an application specific integrated circuit (ASIC), reconfigurable hardware or hardware circuitry, or other specialized hardware to facilitate performance of the functions described herein.

The analog-to-digital converter (ADC) 316 may be embodied as any circuit, device, or collection thereof, capable of converting an analog signal received from measurement circuit 308 to a digital signal.

The memory 318 may be embodied as any type of volatile (e.g., dynamic random access memory (DRAM), etc.) or non-volatile memory or data storage capable of performing the functions described herein. Volatile memory may be a storage medium that requires power to maintain the state of data stored by the medium. Non-limiting examples of volatile memory may include various types of random access memory (RAM), such as dynamic random access memory (DRAM) or static random access memory (SRAM).

The communication circuit 306 of the MCU 302 may be embodied as any communication circuit, device, or collection thereof. The communication circuit 306 may be configured to use any one or more communication technology and associated protocols (e.g., Highway Addressable Remote Transducer (HART), Foundation Fieldbus, PROFI-BUS, Modbus, Ethernet, Bluetooth®, Wi-Fi®, WiMAX, etc.) to effect such communication.

The measurement circuit 308 may be embodied as any circuit, device, or collection thereof, capable of generating RF signals to be applied to the waveguide probe 312 and measuring resulting RF signals from the waveguide probe 312. In the some embodiments, the measurement circuit 308 may include a number of components, such as a timing circuit including multiple oscillators, a coincidence circuit for comparing oscillator signals, pulsors, and a mixing and filtering circuit, similar to those described in U.S. patent application Ser. No. 16/371,126, filed Apr. 1, 2019, which are not shown or further described here so as not to obscure the present disclosure.

Figure 4:
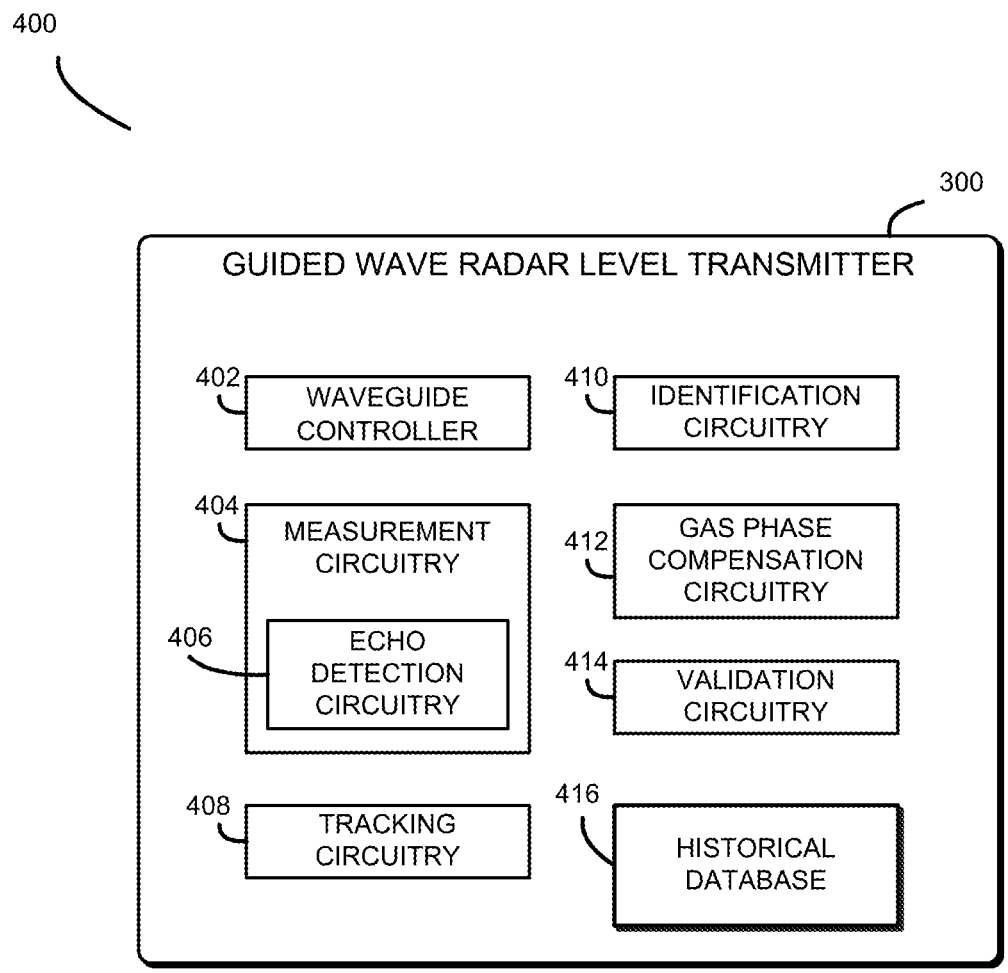
FIG. 4 is a simplified block diagram of an illustrative environment of the GWR level transmitter of FIGS. 1-3.

Referring now to FIG. 4, in use, the guided wave radar level transmitter 300 and the MCU 302 establishes an environment 400. The illustrative environment 400 includes a waveguide controller 402, measurement circuitry 404, echo detection circuitry 406, tracking circuitry 408, identification circuitry 410, gas phase compensation circuitry 412, validation circuitry 414, and a historical database 416. The various modules of the environment 400 may be embodied as hardware, firmware, software, or a combination thereof. For example, the various modules, logic, and other components of the environment 400 may form a portion of, or otherwise be established by, the processor 312 or other hardware components of the MCU 302.

The waveguide controller 402 is configured to transmit a series of electric pulses and receive a reflected waveform. To do so, the waveguide controller 402 transmits electric pulses along a waveguide probe 312. The waveguide controller 402 may generate frequency signals using the measurement circuit 308. The signal may be emitted at a predetermined pulse repetition frequency along a waveguide probe 312. Further, the waveguide controller 402 receives a reflected waveform at the waveguide probe 312 in response to transmitting the electric pulses.

The measurement circuitry 404 is configured to analyze the received waveform. To do so, the measurement circuitry 404 performs a pre-launch analysis on the reflected waveform. In some embodiments, the measurement circuitry 404 may identify a first peak of the reflected waveform. The properties of the first peak may then be compared to an expected range of values. If the properties are within the expected range of values, then the first peak may be flagged as the PCB connection. If the properties are not within the expected range of values, then the user may be notified that there may be a loss of connection.

In some embodiments, the measurement circuitry 404 may next identify second and third peaks of the reflected waveform. The properties of the second and third peaks may then be compared to one or more expected ranges of values. If the properties are within the expected range(s) of values then, the second and third peaks may be flagged as negative and positive transmission line echoes, respectively. If the properties are not within the expected range(s) of values then, the user may be notified of an error. The transmission line echoes may be used as a self-test, as the transmission line is internal to the GWR level transmitter 102 and, therefore, behaves independent of the application to which the GWR level transmitter 102 is put.

In some embodiments, the measurement circuitry 404 may next identify a fourth peak of the reflected waveform. The measurement circuitry 404 may determine that the fourth peak is a cable connection echo. If the fourth peak is the cable connection echo, then the measurement circuitry 404 may compare the properties of the fourth peak to expected values to determine if the echo represents a coupler connection or a loss of connection error. If the fourth peak is not the cable connection echo, then the fourth peak is flagged as the internal coupler connection. The properties of the fourth peak are then compared with expect values to determine if an error has occurred. In some embodiments, the error may be an internal coupler error or a broken seal error.

In some embodiments, the measurement circuitry 404 may next identify a fifth peak of the reflected waveform. The properties of the fifth peak may then be compared to an expected range of values. If the properties are within the expected range of values then, the fifth peak may be flagged as the launch probe. If the properties are not within the expected range of values, then the user is notified that there may be an unconnected probe.

The measurement circuitry 404 contains the echo detection circuitry 406. The echo detection circuitry 406 is configured to detect or identify echoes in the reflected waveform. To do so, the echo detection circuitry 406 may apply a filter to the reflected waveform. In some embodiments, a Savitzky-Golay filter is applied to the reflected waveform. The echo detection circuitry 406 may then preform a preliminary detection or identification of all echoes using a zero-crossing method. In some embodiments, the echo detection circuitry 406 may detect the echoes by having their slopes compared to predetermined threshold. The slope threshold may be related to the first and/or the second derivative of the slope. In some embodiments, the echo detection circuitry 406 may determine a baseline for the filtered reflected waveform. In some embodiments the echo detection circuitry 406 may determine the echo width as a given percentage of the echo height for each detected echo. In some embodiments, the echo detection circuitry 406 will ignore unwanted echoes. The echo detection circuitry 406 will then generate an echo list based on the identified echoes.

The measurement circuitry 404 is further configured to calculate a distance measurement for each echo in the echo list. In some embodiments, the measurement circuitry 404 may determine a distance measurement for each echo in the echo list based on the known properties of RF waves and timing parameters. In some embodiments, the measurement circuitry 404 may determine a distance measurement for each echo in the echo list based on historical data. In some embodiments, the measurement circuitry 404 may determine the distance measurement of each echo in the echo list by comparing each echo in the echo list with a known distance. The measurement circuitry 404 is further configured to adjust the distance of each echo in the echo list by a known factor. In some embodiments, the measurement circuitry 404 may apply a correction based on one or more values from at least one look-up table. In some embodiments, the measurement circuitry 404 may apply a gas phase compensation (GPC) correction factor to the distance of each echo. The GPC factor may be based on the characteristic of a classified echo at a known positon at a known distance along the wave guide probe. In some embodiments, the measurement circuitry 404 may apply a correction based on temperature.

The tracking circuitry 408 is configured to associate each echo in the echo list with an echo track. To do so, tracking circuitry 408 retrieves the echo track list from the historical database 416. The echo track list may be referred to as a state estimator filter. Each echo track in the echo track list represents the history of a particular echo that has been previously identified. The echo track contains the history of that echo and its properties over previous frames or previously received waveforms. The echo track list or state estimator filter tracks the plurality of echoes identified across digital representations of server reflective waveforms resulting from transmission of several pulse along the waveguide probe. The tracking circuitry 408 may predict the current echo position and amplitude on the current received waveform for each of the echo tracks on the echo track list based on historical track data. In some embodiments, the tracking circuitry 408 may predict the current echo track properties based on the echo track properties in the previous frame. In some embodiments, the tracking circuitry 408 may predict the current echo track properties based the previous echo track properties and the rate of change of echo track properties over the previous frames.

The tracking circuitry 408 then associates each echo in the echo list with an echo track from the echo track list. In some embodiments, the tracking circuitry 408 may associate the echo list of the received waveform with the echo track list based on the predicted echo track positions. In some embodiments, the tracking circuitry 408 may associate the echo list of the received waveform with the echo track list based the measurements of each echo compared with the measurements of echoes in the echo track. Once each echo has been associated with an echo track in the track list, the echo is added into the corresponding echo track. If a new echo is in the echo list that does not have a new corresponding track, then the tracking circuitry 408 may create a new track in the track list. In some embodiments, tracking circuitry 408 may update the echo track list in the historical database 416 based on the current echo list.

The identification circuitry 410 is configured to identify or classify each echo track in the echo track list. To do so, the identification circuity 410 may calculate the probability of the label or classification for each echo track in the echo track list. The labels which may be used include at least a surface level (or surface levels) of the media in the tank, end of the wave guide probe, a physical interface between the wave guide probe and measurement circuit, and a gas compensation marker positioned at a known distance along the wave guide probe (to serve as a reference point to calculate and compensate for the effects of air, steam, etc. influencing the speed of the pulses). In some embodiments, the identification circuitry 410 may calculate the probability of the label of each track based on historical data. In some embodiments, the identification circuitry 410 may calculate the probability of the label of each echo based on user inputted data or knowledge of the GWR level transmitter.

The identification circuitry 410 further assigns a label or classification to each of the echo tracks. In some embodiments, the identification circuitry 410 may assign labels or classify each echo track in the track list based on probability. In some embodiments, the identification circuitry 410 may assign labels based on the characteristics of the echo track. In some embodiments, the identification circuitry 410 may assign labels based on historical data. In some embodiments, the identification circuitry 410 may assign labels to each echo track base on a set of logical rules to one or more characteristic of each of the plurality of echoes to determine the source the echo. Using any or all of these factors, the identification circuitry 410 may assign a label (or labels) to the most easily identifiable echo(es) first. This knowledge may then be used to update the possible classifications for the remaining echoes to increase accuracy in their identification. This process may be performed iteratively for each of the echoes. In some embodiments, the identification circuitry 410 may assign a label to an unknown track (e.g., noise echoes) as "false echo" to prevent such an from being identified in the future as the media surface. The identification circuitry 410 can also use this knowledge to perform dynamic merging of the level echo and a false echo whenever the level approaches a false echo position. This merging allows the identification circuitry 410 to maintain good accuracy and avoid losing the track during the merge.

The identification circuitry 410 further determines the distance to the surface of the media. The identification circuitry 410 previously assigned a label of distance to surface media to one of the echo tracks. The corresponding distance related that echo track is the distance to the surface of the media. If none of the tracks are assigned the label of surface level of the media, then the identification circuitry 410 may use the track assigned the label end of the waveguide probe to represent the surface level of the media. In some embodiments, the identification circuitry 410 may determine a distance measurement for the echo track based on the known properties of RF waves and timing parameters. In some embodiments, the identification circuitry 410 may determine a distance measurement for the echo track based on historical data. In some embodiments, the identification circuitry 410 may determine the distance measurement of the echo track by comparing each echo in the echo list with a known distance.

The gas phase compensation circuitry 412 is configured to maintain the gas phase compensator. The gas phase compensator corresponds to an echo track with a known distance along the waveguide. The gas phase compensator may be used to adjust the distance measurements for each identified echo. The gas phase compensation circuitry 412 may update the current gas phase compensation factor based on the echo track labeled GPC reference marker The validation circuitry 414 is configured to validate the labeling of echo tracks. In some embodiments, the validation circuitry 414 may validate the labels by comparing the properties of the echo tracks to an expected threshold. The validation circuitry 414 may further apply a filter to the received waveform. In some embodiments the filter may be a median filter or a dampening filter.

The historical database 416 is configured to maintain the echo track list. The echo track list may be referred to as a state estimator filter. Each echo track in the echo track list represents the history of a particular echo that has been previously identified. The echo track contains the history of that echo and its properties over previous frames or previously received waveforms. The echo track list or state estimator filter tracks the plurality of echoes identified across digital representations of server reflective waveforms resulting from transmission of several pulse along the waveguide probe.

Figure 5:
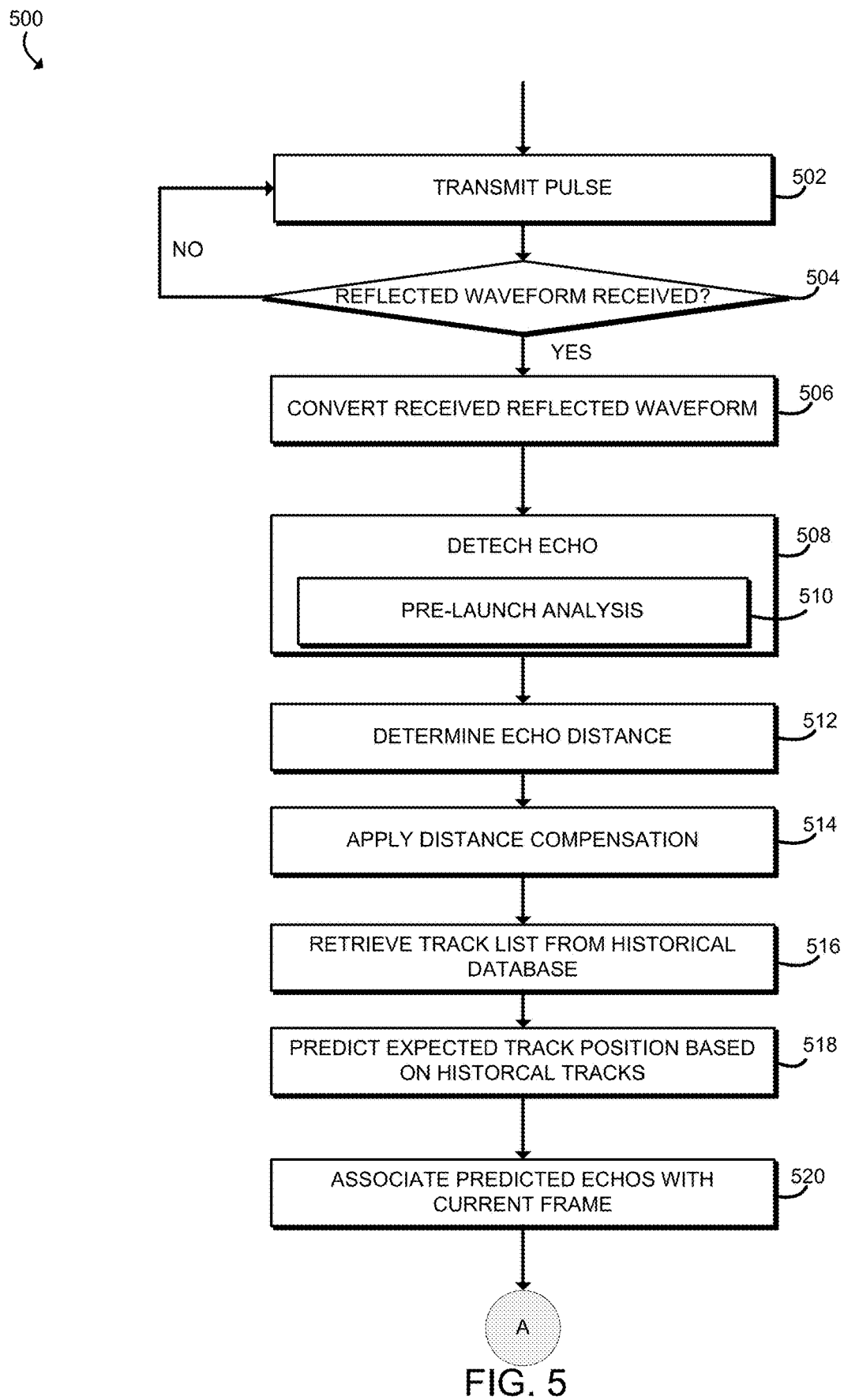
FIGS. 5 and 6 together show a simplified flow diagram of one illustrative embodiment of an expert control method for level measurement that may be implemented by the GWR level transmitter of FIGS. 1-4.
Figure 6:
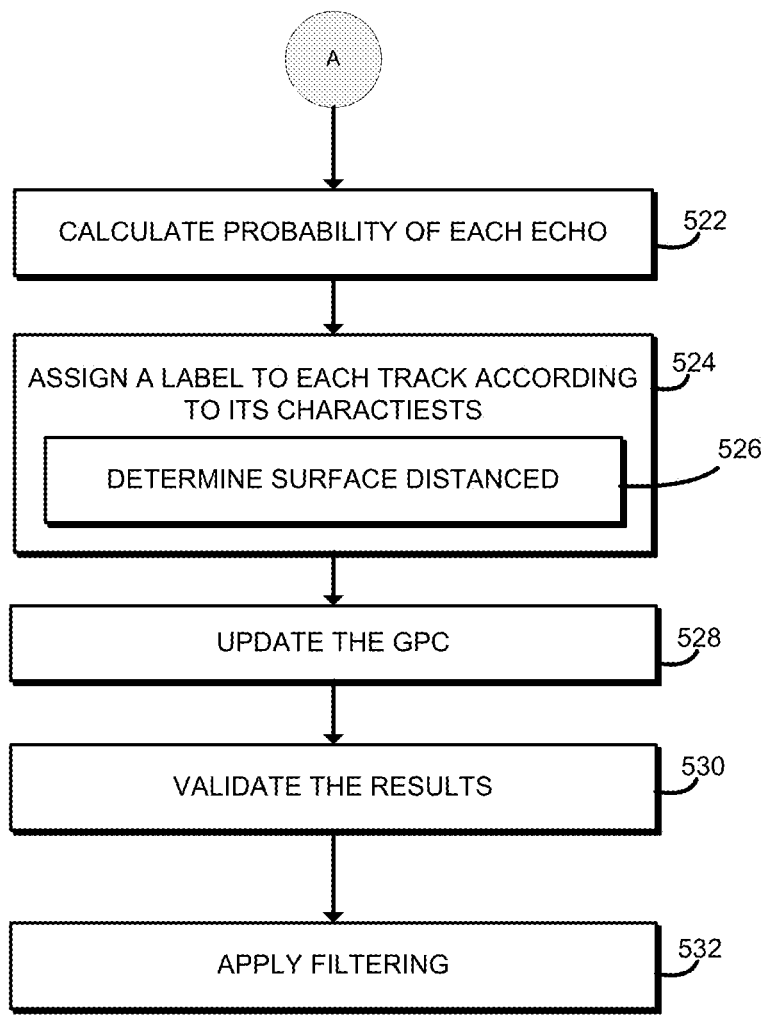

Referring now to FIGS. 5 and 6, in use, the GWR level transmitter 300 may execute a method 500 for determining a level of a media in a tank. The method begins with block 502 in which the GWR level transmitter 300 transmits an electric signal pulse along a waveguide probe 312. The GWR level transmitter 300 may generate frequency signals using the measurement circuit 308. The signal from the measurement circuit 308 may be emitted at a predetermined pulse repetition frequency along a waveguide probe 312.

In block 504, the GWR level transmitter 300 determines if a reflected signal has been received at the waveguide probe 312 in response to transmitting the electronic signal pulse. If the GWR level transmitter 300 determines that a reflected signal has not been received in block 504, the method 500 loops back to block 502 to transmit new electronic signal pulse. If, however, the GWR level transmitter 300 determines that a reflected signal has been received in block 306, the method 300 advances to block 506.

In block 506, the Analog to Digital converter 314 of the MCU 302 converts the received reflected waveform into a digital representation of the reflected waveform. The MCU 302 receives the reflected signal or reflected waveform from the waveguide probe 312 thought the I/O circuit 370 and the I/O subsystem 320. The MCU 302 uses its ADC converter 314 to process the received waveform into a digital representation.

In block 508, the MCU 302 analyzes the digital representation of the reflected waveform in order to detect each echo within the reflected waveform. The MCU 302 preforms a pre-launch analysis in block 510 as part of the echo detection process.

In block 510, the MCU 302 performs a pre-launch analysis on the reflected waveform. In some embodiments, the MCU 302 may identify a first peak of the reflected waveform. The properties of the first peak may then be compared to an expected range of values. If the properties are within the expected range of values, then the first peak may be flagged as the PCB connection. If the properties are not within the expected range of values, then the user may be notified that there may be a loss of connection. In some embodiments, the MCU 302 may next identify second and third peaks of the reflected waveform. The properties of the second and third peaks may then be compared to one or more expected ranges of values. If the properties are within the expected range(s) of values then, the second and third peaks may be flagged as negative and positive transmission line echoes, respectively. If the properties are not within the expected range(s) of values then, the user may be notified of an error. In some embodiments, the MCU 302 may next identify a fourth peak of the reflected waveform. The MCU 302 may determine that the fourth peak is a cable connection echo. If the fourth peak is the cable connection echo, then the measurement circuitry 404 may compare the properties of the fourth peak to expected values to determine if the echo represents a coupler connection or a loss of connection error. If the fourth peak is not the cable connection echo, then the fourth peak is flagged as the internal coupler connection. The properties of the fourth peak are then compared with expect values to determine if an error has occurred. In some embodiments, the error may be an internal coupler error or a broken seal error. In some embodiments, the MCU 302 may next identify a fifth peak of the reflected waveform. The properties of the fifth peak may then be compared to an expected range of values. If the properties are within the expected range of values then, the fifth peak may be flagged as the launch probe. If the properties are not within the expected range of values, then the user is notified that there may be an unconnected probe.

After the pre-launch analysis, the MCU 302 continues the process of detecting echoes. The MCU 302 may apply a filter to the reflected waveform. In some embodiments, a Savitzky-Golay filter is applied to the reflected waveform. The MCU 302 may then preform a preliminary detection or identification of all echoes using a zero-crossing method. In some embodiments, the echoes may be detected by having their slopes compared to predetermined threshold. The slope threshold may be related to the first and/or the second derivative of the slope. In some embodiments, the MCU 302 may determine a baseline for the filtered reflected waveform. In some embodiments the MCU 302 may determine the echo width as a given percentage of the echo height for each detected echo. In some embodiments, the MCU 302 will ignore unwanted echoes. The MCU 302 will then generate an echo list based on the identified echoes.

In block 512, the MCU 302 determines a distance measurement for each echo in the echo list. In some embodiments, the MCU 302 may determine a distance measurement for each echo in the echo list based on the known properties of RF waves and timing parameters. In some embodiments, the MCU 302 may determine a distance measurement for each echo in the echo list based on historical data. In some embodiments, the MCU 302 may determine the distance measurement of each echo in the echo list by comparing each echo in the echo list with a known distance.

In block 514, the MCU 302 adjusts the distance of each echo in the echo list by a known factor. In some embodiments, the MCU 302 may apply a correction based on one or more values from at least one look-up table. In some embodiments, the MCU 302 may apply a gas phase compensation (GPC) correction factor to the distance of each echo. The GPC factor may be based on the characteristic of a classified echo at a known positon at a known distance along the wave guide probe. In some embodiments, the MCU 302 may apply a correction based on temperature.

In block 516, the MCU 302 retrieves the echo track list from the historical database. The echo track list may be referred to as a state estimator filter. Each echo track in the echo track list represents the history of a particular echo that has been previously identified. The echo track contains the history of that echo and its properties over previous frames or previously received waveforms. The echo track list or state estimator filter tracks the plurality of echoes identified across digital representations of server reflective waveforms resulting from transmission of several pulse along the waveguide probe.

In block 518, the MCU 302 predicts the current echo position and amplitude on the current received waveform for each of the echo tracks on the echo track list based on historical track data. In some embodiments, the MCU 302 may predict the current echo track properties based on the echo track properties in the previous frame. In some embodiments, the MCU 302 may predict the current echo track properties based the previous echo track properties and the rate of change of echo track properties over the previous frames.

In block 520, the MCU 302 associates each echo in the echo list with an echo track from the echo track list. In some embodiments, the MCU 302 may associate the echo list of the received waveform with the echo track list based on the predicted echo track positions. In some embodiments, the MCU 302 may associate the echo list of the received waveform with the echo track list based the measurements of each echo compared with the measurements of echoes in the echo track. Once each echo has been associated with an echo track in the track list, the echo is added into the corresponding echo track. If a new echo is in the echo list that does not have a new corresponding track, then the MCU 302 may create a new track in the track list. In some embodiments, the MCU 302 may update the echo track list in the historical database 416 based on the current echo list.

In block 522, the MCU 302 calculates the probability of the label or classification for each echo track in the echo track list. The labels which may be used include at least surface level of the media in the tank, end of the wave guide probe, a physical interface between the wave guide probe and measurement circuit, and a gas compensation marker positioned at a known distance along the wave guide probe. In some embodiments, the MCU 302 may calculate the probability of the label of each track based on historical data. In some embodiments, the MCU 302 may calculate the probability of the label of each echo based on user inputted data or knowledge of the GWR level transmitter.

In block 524, the MCU 302 assigns a label or classification to each of the echo tracks. In some embodiments, the MCU 302 may assign labels or classify each echo track in the track list based on probability. In some embodiments, the MCU 302 may assign labels based on the characteristics of the echo track. In some embodiments, the MCU 302 may assign labels based on historical data. In some embodiments, the MCU 302 may assign labels to each echo track base on a set of logical rules to one or more characteristic of each of the plurality of echoes to determine the source the echo.

In block 526, the MCU 302 determines the distance to the surface of the media. The MCU 302 previously assigned a label of distance to surface media to one of the echo tracks in block 524. The corresponding distance related that echo track is the distance to the surface of the media. If none of the tracks are assigned the label of surface level of the media, then the MCU 302 may use the track assigned the label end of the waveguide probe to represent the surface level of the media. In some embodiments, the MCU 302 may determine a distance measurement for the echo track based on the known properties of RF waves and timing parameters. In some embodiments, the MCU 302 may determine a distance measurement for the echo track based on historical data. In some embodiments, the MCU 302 may determine the distance measurement of the echo track by comparing each echo in the echo list with a known distance.

In block 528, the MCU 302 may update the current gas phase compensation factor. The MCU 302 may update the current gas phase compensation factor based on the echo track labeled GPC reference marker.

In block 530, the MCU 302 validates the labels for each of the echo tracks. In some embodiments, the MCU 302 may validate the labels by comparing the properties of the echo tracks to an expected threshold.

In block 532, the MCU 302 applies a filter to the received waveform. In some embodiments the filer may be a median filter or a dampening filter. After block 532, the MCU 302 returns to the beginning of method 500.

Figure 7:
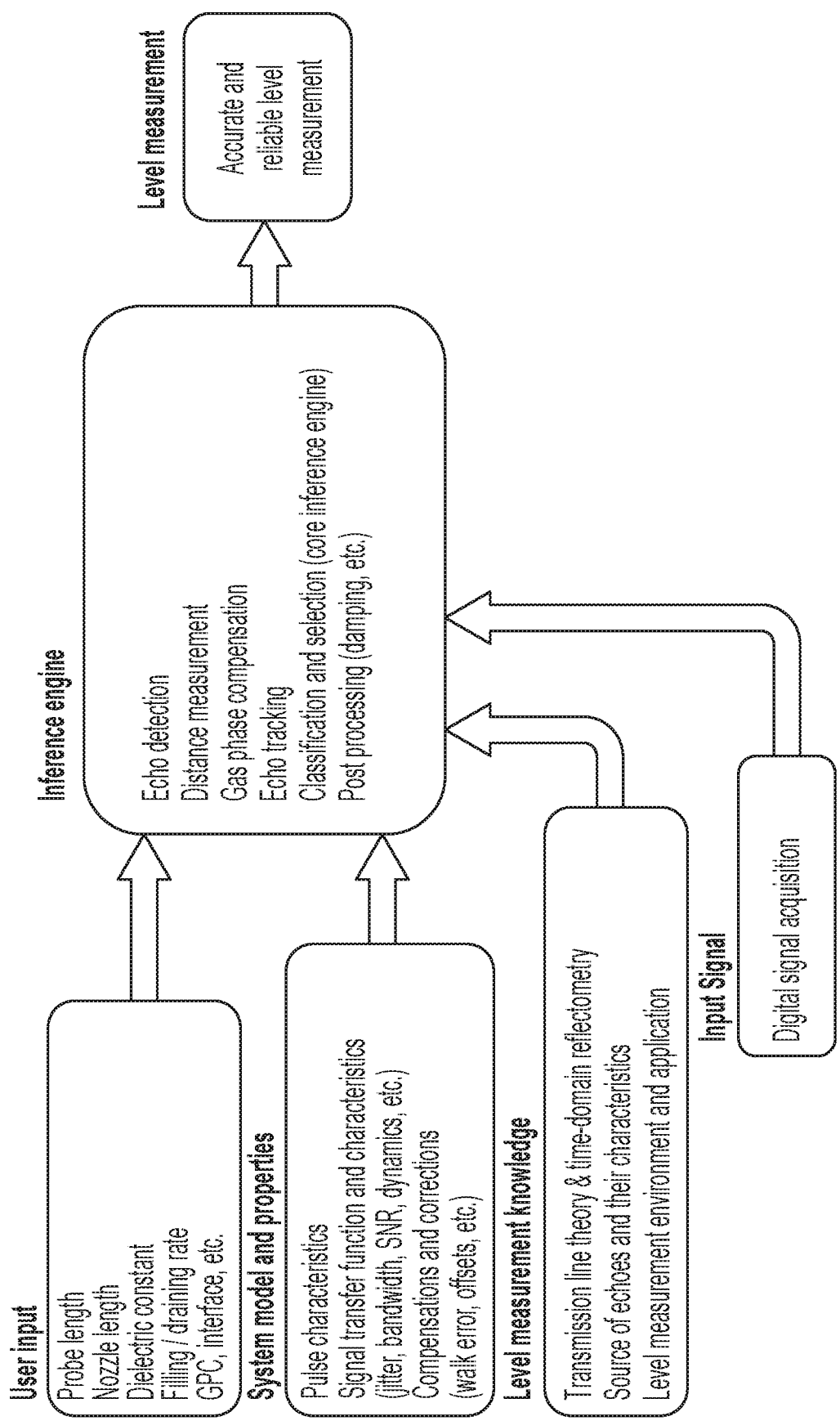
FIG. 7 is a simplified block diagram illustrating sources of prior knowledge (including user inputs, system model and properties, level measurement knowledge, and input signals) that may be used by an inference engine of an expert control system of the GWR level transmitter of FIGS. 1-4 to produce an accurate and reliable level measurement.

Referring now to FIG. 7, the MCU 302 of the GWR level transmitter 300 implements an expert control system, which is illustrated as a simplified block diagram. As shown on the left-hand side of FIG. 7, the expert control system comprises a knowledge base that includes a number of sources of prior knowledge, such as user inputs, system model and properties, level measurement knowledge, and input signals. This prior knowledge is used by the inference engine of the expert control system to apply a set of logical rules to the reflected waveforms measured by the GWR level transmitter to produce an accurate and reliable level measurement.

While certain illustrative embodiments have been described in detail in the figures and the foregoing description, such an illustration and description is to be considered as exemplary and not restrictive in character, it being understood that only illustrative embodiments have been shown and described and that all changes and modifications that come within the spirit of the disclosure are desired to be protected. There are a plurality of advantages of the present disclosure arising from the various features of the methods, systems, and articles described herein. It will be noted that alternative embodiments of the methods, systems, and articles of the present disclosure may not include all of the features described yet still benefit from at least some of the advantages of such features. Those of ordinary skill in the art may readily devise their own implementations of the methods, systems, and articles that incorporate one or more of the features of the present disclosure.

The invention claimed is:

1. A guided wave radar (GWR) level transmitter comprising:
    a waveguide probe to be positioned in a tank containing media;
    a measurement circuit to transmit series of pulses along the waveguide probe and to measure a series of reflected waveforms, each of the series of reflected waveforms resulting from transmission of one of the series of pulses along the waveguide probe; and a compute device to implement an expert control system to determine a level of the media in the tank, wherein the expert control system comprises (i) a knowledge base incorporating prior knowledge and (ii) an inference engine to apply logical rules from the knowledge base to evaluate information contained in the series of reflected waveforms to determine the level of media in the tank, and wherein the prior knowledge comprises (i) a system model of the GWR level transmitter and (ii) behaviors associated with typical level measurement applications.

2. The GWR level transmitter of claim 1, wherein the prior knowledge of the system model of the GWR level transmitter comprises one or more of characteristics of the series of pulses transmitted by the measurement circuit, characteristics of a signal transfer function of the GWR level transmitter, and compensations and corrections associated with the GWR level transmitter.

3. The GWR level transmitter of claim 1, wherein the prior knowledge of the behaviors associated with typical level measurement applications comprises one or more of transmission line theory information, time-domain reflectometry information, characteristics associated with typical level measurement environments, possible sources of echoes in the series of reflected waveforms, and typical characteristics of echoes generated by each of the possible sources.

4. The GWR level transmitter of claim 1, wherein the prior knowledge further comprises system parameters supplied by a user of the GWR level transmitter.

5. The GWR level transmitter of claim 4, wherein the system parameters supplied by the user of the GWR level transmitter comprise one or more of a type of the waveguide probe, a length of the waveguide probe, an end type of the waveguide probe, a position of a gas phase compensation marker disposed on the waveguide probe, a nozzle length, a dielectric constant of the media, a category of dielectric constants associated with a type of the media, an interface characteristic of the media, a filling rate of the media, a draining rate of the media, a blocking distance, a type of the tank, a presence of remote electronics, and process conditions for the media.

6. The GWR level transmitter of claim 1, wherein the expert control system comprises echo detection circuitry to detect a plurality of echoes present in each of the series of reflected waveforms and to generate an echo list for each reflected waveform, each echo list identifying the plurality of echoes present in the corresponding reflected waveform and one or more characteristics of each of the plurality of echoes.

7. The GWR level transmitter of claim 6, wherein the one or more characteristics of each of the plurality of echoes included in the echo list comprises an amplitude of the echo and a position of the echo within the corresponding reflected waveform.

8. The GWR level transmitter of claim 6, wherein the expert control system comprises echo tracking circuitry to implement a state estimator filter to track a plurality of recurrent echoes present in successive echo lists generated by the echo detection circuitry and to generate a track list that identifies the plurality of recurrent echoes and one or more characteristics of each of the plurality of recurrent echoes.

9. The GWR level transmitter of claim 8, wherein the expert control system comprises echo classification circuitry to evaluate a probability of each of the plurality of recurrent echoes in the track list belonging to each of a plurality of echo categories and to generate a labelled track list that associates each of the plurality of recurrent echoes with one of the plurality of echo categories based upon the evaluated probabilities.

10. The GWR level transmitter of claim 9, wherein the plurality of echo categories comprise two or more of an echo representing a surface of the media in the tank, an echo representing an end of the waveguide probe, an echo representing a physical interface between the waveguide probe and the measurement circuit, an echo representing a nozzle, an echo representing a gas phase compensation marker positioned at a known distance along the waveguide probe, an echo representing noise, an echo representing hardware of the GWR level transmitter, and a bounce-back echo of any of the foregoing echo categories.

11. The GWR level transmitter of claim 9, wherein the expert control system comprises decision circuitry to select one of the plurality of recurrent echoes from the labelled track list and to calculate the level of media in the tank based upon the selected echo, wherein the selected echo represents one of a surface of the media in the tank and an end of the waveguide probe.

12. The GWR level transmitter of claim 1, wherein the measurement circuit and the compute device operate using less than 20 mW of power.

13. A method comprising:
transmitting series of pulses along a waveguide probe positioned in a tank containing media;
measuring a series of reflected waveforms, each of the series of reflected waveforms resulting from transmission of one of the series of pulses along the waveguide probe; and
evaluating information contained in the series of reflected waveforms using an expert control system to determine the level of media in the tank, wherein the expert control system comprises (i) a knowledge base incorporating prior knowledge and (ii) an inference engine to apply logical rules from the knowledge base, and wherein the prior knowledge comprises (i) a system model of the GWR level transmitter and (ii) behaviors associated with typical level measurement applications.

14. The method of claim 13, wherein the prior knowledge further comprises system parameters supplied by a user.

15. The method of claim 13, wherein evaluating the information using the expert control system comprises:
detecting a plurality of echoes present in each of the series of reflected waveforms; and
generating an echo list for each reflected waveform, each echo list identifying the plurality of echoes present in the corresponding reflected waveform and one or more characteristics of each of the plurality of echoes.

16. The method of claim 15, wherein the one or more characteristics of each of the plurality of echoes included in the echo list comprises an amplitude of the echo and a position of the echo within the corresponding reflected waveform.

17. The method of claim 15, wherein evaluating the information using the expert control system further comprises:
implementing a state estimator filter to track a plurality of recurrent echoes present in successive echo lists generated by the echo detection circuitry; and
generating a track list that identifies the plurality of recurrent echoes and one or more characteristics of each of the plurality of recurrent echoes.

18. The method of claim 17, wherein evaluating the information using the expert control system further comprises:
- evaluating a probability of each of the plurality of recurrent echoes in the track list belonging to each of a plurality of echo categories; and
- generating a labelled track list that associates each of the plurality of recurrent echoes with one of the plurality of echo categories based upon the evaluated probabilities.

19. The method of claim 18, wherein the plurality of echo categories comprise two or more of an echo representing a surface of the media in the tank, an echo representing an end of the waveguide probe, an echo representing a physical interface between the waveguide probe and the measurement circuit, an echo representing a nozzle, an echo representing a gas phase compensation marker positioned at a known distance along the waveguide probe, an echo representing noise, an echo representing hardware of the GWR level transmitter, and a bounce-back echo of any of the foregoing echo categories.

20. The method of claim 18, wherein evaluating the information using the expert control system further comprises:
- selecting one of the plurality of recurrent echoes from the labelled track list; and
- calculating the level of media in the tank based upon the selected echo, wherein the selected echo represents one of a surface of the media in the tank and an end of the waveguide probe.

* * * * *